(12) United States Patent
Ahn et al.

(10) Patent No.: US 11,032,512 B2
(45) Date of Patent: Jun. 8, 2021

(54) SERVER AND OPERATING METHOD THEREOF

(71) Applicant: HYPERCONNECT INC., Seoul (KR)

(72) Inventors: Sang Il Ahn, Chungcheongbuk-do (KR); Hyeok Choi, Seoul (KR)

(73) Assignee: HYPERCONNECT INC., Seoul (KR)

( * ) Notice: Subject to any disclaimer, the term of this patent is extended or adjusted under 35 U.S.C. 154(b) by 0 days.

(21) Appl. No.: 16/188,477

(22) Filed: Nov. 13, 2018

(65) Prior Publication Data
US 2019/0158784 A1 May 23, 2019

(30) Foreign Application Priority Data

Nov. 17, 2017 (KR) .................. 10-2017-0153590

(51) Int. Cl.
*H04N 7/14* (2006.01)
*H04L 29/06* (2006.01)
(Continued)

(52) U.S. Cl.
CPC ......... *H04N 7/147* (2013.01); *G06K 9/00281* (2013.01); *G06K 9/00288* (2013.01);
(Continued)

(58) Field of Classification Search
USPC ...................................... 348/14.01
See application file for complete search history.

(56) References Cited

U.S. PATENT DOCUMENTS 8,296,172 B2 * 10/2012 Marci ............... A61B 5/16
705/7.29
9,531,998 B1 * 12/2016 Farrell ............. A63F 13/352
(Continued)

FOREIGN PATENT DOCUMENTS

| KR | 20000054824 A | 9/2000 |
|----|---------------|--------|
| KR | 10-0716422 B1 | 5/2007 |
| KR | 10-2013-0007363 A | 1/2013 |
| KR | 10-2013-0021797 A | 3/2013 |

* cited by examiner

OTHER PUBLICATIONS

Notice of Allowance issued in Korean Patent Application No. 10-2017-0153590, dated Dec. 10, 2019.

*Primary Examiner* — Maria El-Zoobi
(74) *Attorney, Agent, or Firm* — Merchant & Gould P.C.

(57) ABSTRACT

A server includes a session management device establishing a video call session between a first electronic apparatus of a first user and a second electronic apparatus of a second user, a communication device receiving match satisfaction calculated from the first electronic apparatus through the video call session, an image analysis device obtaining first feature point distribution information from a face image of the first user and obtaining second feature point distribution information from a face image of the second user, a processor training a machine learning model by using the first feature point distribution information, the second feature point distribution information, and the match satisfaction and estimating the match satisfaction of the first user for each of standby users by using the trained machine learning model when a video call connection between the first electronic apparatus and the second electronic apparatus is terminated, and a user management device selecting a third user, who becomes a next video call counterpart of the first user, from among the standby users by using the estimated match satisfaction.

20 Claims, 10 Drawing Sheets

(51) Int. Cl.

| | |
|---|---|
| *G06K 9/00* | (2006.01) |
| *G06K 9/62* | (2006.01) |
| *G06N 20/00* | (2019.01) |
| *H04N 7/15* | (2006.01) |
| *G06Q 50/00* | (2012.01) |
| *G06Q 30/02* | (2012.01) |

(52) U.S. Cl.
CPC ........... *G06K 9/6256* (2013.01); *G06N 20/00* (2019.01); *G06Q 30/02* (2013.01); *G06Q 50/01* (2013.01); *H04L 65/1046* (2013.01); *H04L 65/1069* (2013.01); *H04L 65/1083* (2013.01); *H04L 65/1086* (2013.01); *H04N 7/141* (2013.01); *H04N 7/152* (2013.01)

(56) References Cited

U.S. PATENT DOCUMENTS

| | | | |
|---|---|---|---|
| 2014/0043426 A1* | 2/2014 | Bicanic | H04L 51/046 |
| | | | 348/14.02 |
| 2014/0149177 A1* | 5/2014 | Frank | G06F 40/30 |
| | | | 705/7.29 |
| 2016/0191958 A1* | 6/2016 | Nauseef | H04N 21/8153 |
| | | | 725/116 |
| 2018/0107866 A1* | 4/2018 | Li | G06K 9/00268 |
| 2018/0285646 A1* | 10/2018 | Jalan | G06Q 50/01 |

SERVER AND OPERATING METHOD THEREOF

CROSS-REFERENCE TO RELATED APPLICATION

This application is claims the benefit of priority to Korean Patent Application No. 10-2017-0153590, filed in the Korean Intellectual Property Office on Nov. 17, 2017, the entire contents of which are incorporated herein by reference.

TECHNICAL FIELD

The present disclosure relates to a server and an operating method thereof.

BACKGROUND

Nowadays, a matching service to meet new friends by using the video call function of a terminal is becoming popular. Generally, after analyzing profile information such as the academic background, region, age, and interest of each of users to search for an appropriate counterpart, the matching service may use the method of connecting with the found counterpart. For example, the matching service is a method of searching for and connecting with a counterpart who is at the same level as a user's academic level, a counterpart who resides in the same place as the user's residential administration area, and a counterpart whose age is similar to the user's age.

However, such the general matching service may provide a method of matching a user found through an algorithm based on the above-mentioned academic background, region, age, and interest as a counterpart of a video call.

SUMMARY

The present disclosure has been made to solve the above-mentioned problems occurring in the prior art while advantages achieved by the prior art are maintained intact.

An aspect of the present disclosure provides a server and an operating method thereof that are capable of improving the match satisfaction with a counterpart during a video call of a user.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an operating method of a server includes receiving a request for a video call connection from a first electronic apparatus of a first user, establishing a video call session between the first electronic apparatus and a second electronic apparatus of a second user, obtaining satisfaction of the first user for the second user, obtaining first face information of the first user and obtaining second face information of the second user, training a machine learning model by using the first face information, the second face information, and the satisfaction, estimating the satisfaction of the first user for each of standby users by using the first face information, face information of each of the standby users, and the trained machine learning model, when the video call connection between the first electronic apparatus and the second electronic apparatus is terminated, and selecting a third user, who becomes a next video call counterpart of the first user, from among the standby users by using the estimated satisfaction.

According to an embodiment, the satisfaction corresponds to match satisfaction calculated from the first electronic apparatus through the video call session.

According to an embodiment, the obtaining of the satisfaction of the first user for the second user includes obtaining at least one or more satisfaction factors of the first user for the second user through the video call session. The training of the machine learning model by using the first face information, the second face information, and the satisfaction includes training the machine learning model by using the first face information, the second face information, and the at least one or more satisfaction factors. The estimating of the satisfaction of the first user for each of the standby users by using the first face information, the face information of each of the standby users, and the trained machine learning model includes estimating at least one or more satisfaction factors of the first user for each of the standby users by using the first face information, the face information of each of the standby users, and the trained machine learning model, and the selecting of the third user, who becomes the next video call counterpart of the first user, from among the standby users by using the estimated satisfaction includes calculating match satisfaction of the first user for each of the standby users by using the estimated at least one or more satisfaction factors and selecting the third user, who becomes the next video call counterpart of the first user, from among the standby users, by using the calculated match satisfaction.

According to an embodiment, the satisfaction corresponds to match satisfaction calculated by using at least one or more satisfaction factors of the first user for the second user obtained through the video call session.

According to an embodiment, the first face information and the second face information correspond to a face image of the first user and a face image of the second user, respectively.

According to an embodiment, the first face information and the second face information correspond to coordinate information about a specific point of a face of the first user and coordinate information about a specific point of a face of the second user, respectively.

According to another aspect of the present disclosure, a server includes a session management device establishing a video call session between a first electronic apparatus of a first user and a second electronic apparatus of a second user, a communication device receiving match satisfaction calculated from the first electronic apparatus through the video call session, an image analysis device obtaining first feature point distribution information from a face image of the first user and obtaining second feature point distribution information from a face image of the second user, a processor training a machine learning model by using the first feature point distribution information, the second feature point distribution information, and the match satisfaction and estimating the match satisfaction of the first user for each of standby users by using the trained machine learning model when a video call connection between the first electronic apparatus and the second electronic apparatus is terminated, and a user management device selecting a third user, who becomes a next video call counterpart of the first user, from among the standby users by using the estimated match satisfaction.

According to an embodiment, the user management device selects a user corresponding to the greatest match satisfaction value of the estimated match satisfaction of each of the standby users, as the third user.

According to an embodiment, the face image of the first user and the face image of the second user are stored in the user management device.

According to an embodiment, each of the first feature point distribution information and the second feature point distribution information includes distribution information of feature points corresponding to eyes, a nose, a mouth, eyebrows, and cheekbones.

According to an embodiment, the user management device selects the second user by using similarity with the face image of the first user.

According to another aspect of the present disclosure, an operating method of a server includes receiving a request for a video call connection from a first electronic apparatus of a first user, establishing a video call session between the first electronic apparatus and a second electronic apparatus of a second user, obtaining first face information of the first user and obtaining second face information of the second user, receiving at least one or more satisfaction factors of the first user for the second user, training at least one or more machine learning models by using the first face information, the second face information, and the at least one or more satisfaction factors, estimating the at least one or more satisfaction factors of the first user for each of standby users by using the first face information, face information of each of the standby users, and the trained machine learning model, when the video call connection between the first electronic apparatus and the second electronic apparatus is terminated, calculating match satisfaction of the first user for each of the standby users by using the estimated at least one or more satisfaction factors, and selecting a third user, who becomes a next video call counterpart of the first user, from among the standby users by using the calculated match satisfaction.

According to an embodiment, the first face information and the second face information correspond to a face image of the first user and a face image of the second user, respectively.

According to an embodiment, the first face information and the second face information correspond to coordinate information about a specific point of a face of the first user and coordinate information about a specific point of a face of the second user, respectively.

According to an embodiment, the receiving of the at least one or more satisfaction factors of the first user for the second user includes receiving a first satisfaction factor and a second satisfaction factor of the first user for the second user. The training of the at least one or more machine learning models by using the first face information, the second face information, and the at least one or more satisfaction factors includes training a first machine learning model by using the first face information, the second face information, and the first satisfaction factor and training a second machine learning model by using the first face information, the second face information, and the second satisfaction factor. The estimating of the at least one or more satisfaction factors of the first user for each of the standby users by using the first face information, the face information of each of the standby users, and the trained machine learning model includes estimating each of the first satisfaction factor and the second satisfaction factor of the first user for each of the standby users by using the trained first machine learning model and the trained second machine learning model, and the calculating of the match satisfaction of the first user for each of the standby users by using the estimated at least one or more satisfaction factors includes calculating the match satisfaction of the first user for each of the standby users by using the estimated first satisfaction factor and the estimated second satisfaction factor.

According to an embodiment, the first satisfaction factor corresponds to whether a first input to select at least one or more objects displayed in the first electronic apparatus is received by the first user, and the second satisfaction factor corresponds to an elapsed time until a second input is received from a point in time when the video call session is established, when the second input to terminate the video call session is received by the first user in the first electronic apparatus.

According to an embodiment, the estimating of each of the first satisfaction factor and the second satisfaction factor of the first user for each of the standby users by using the trained first machine learning model and the trained second machine learning model includes estimating the first satisfaction factor of the first user for each of the standby users by using the first feature point distribution information, feature point distribution of each of the standby users, and the trained first machine learning model and estimating the second satisfaction factor of the first user for each of the standby users by using the first feature point distribution information, the feature point distribution of each of the standby users, and the trained second machine learning model.

According to an embodiment, the selecting of the third user, who becomes the next video call counterpart of the first user, from among the standby users by using the calculated match satisfaction includes selecting a user corresponding to the greatest match satisfaction value of the estimated match satisfaction of each of the standby users, as the third user.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
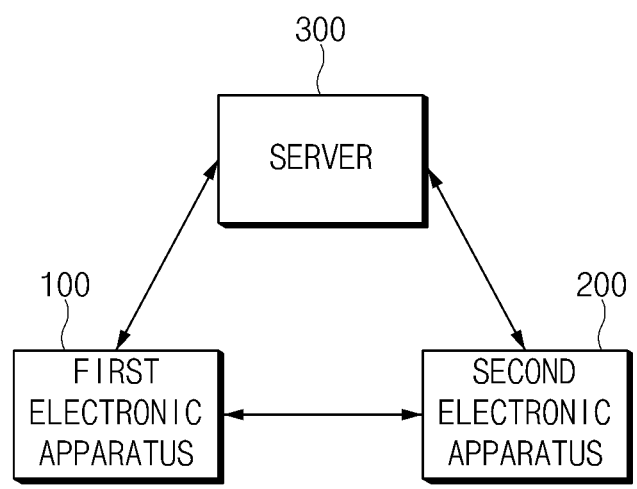
FIG. 1 is a block diagram illustrating a video call system, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that teams used herein should be interpreted as having a meaning that is consistent with their meaning in the context of the present disclosure and the relevant art and will not be interpreted in an idealized or overly formal sense unless expressly so defined herein.

In the present disclosure, an 'electronic apparatus' may include not only a cellular phone, a smart phone having a wireless communication function, a personal digital assistant (PDA) having a wireless communication function, a wireless modem, a portable computer having a wired/wireless communication function, a photographing device such as a digital camera having a wired/wireless communication function, a gaming device with a wired/wireless communication function, a music storing and playing appliances with a wired/wireless communication function, an Internet appliance capable of accessing and browsing wired/wireless Internet, but also portable units or terminals incorporating combinations of such functions, but may not be limited thereto.

FIG. 1 is a block diagram illustrating a video call system, according to an embodiment of the present disclosure.

Referring to FIG. 1, a video call system 10 according to an embodiment of the present disclosure may include a first electronic apparatus 100, a second electronic apparatus 200, and a server 300. The first electronic apparatus 100, the second electronic apparatus 200, and the server 300 may be connected through a wired or wireless communication network.

Each of the first electronic apparatus 100 and the second electronic apparatus 200 may include a video call function. For example, the video call function may be included in each of the first electronic apparatus 100 and the second electronic apparatus 200 in the form of a video call application, and a user may launch the application included in the first electronic apparatus 100 or the second electronic apparatus 200 to make a video call to another counterpart by using the video call function.

For example, the user of the first electronic apparatus 100 may launch the video call application and may make a request for a video call connection to a user of the second electronic apparatus 200 to the server 300. The server 300 receiving the request may verify the communication state of the second electronic apparatus 200 and may establish a session for a video call between the first electronic apparatus 100 and the second electronic apparatus 200, and thus may make it possible to make a video call between users of the first electronic apparatus 100 and the second electronic apparatus 200.

In addition, for example, the user of the first electronic apparatus 100 may launch a video call application to make a request for a video call connection to an arbitrary user, to the server 300. The server 300 receiving the request may estimate match satisfaction between a user of the first electronic apparatus 100 and each of a plurality of other users, by using the profile information (e.g., a user image, or the like) of a user of the first electronic apparatus 100 and the trained machine learning model.

For example, the server 300 may train a machine learning model corresponding to the correlation between a face image of a user of the first electronic apparatus 100, a face image of another user, and match satisfaction associated with the matching result of a first user. For another example, the server 300 may train the machine learning model corresponding to the correlation between feature point distribution information obtained from the face image of a user of the first electronic apparatus 100, feature point distribution information obtained from the face image of another user, and the match satisfaction associated with the matching result of the first user. Furthermore, the server 300 may select the next counterpart to be matched with the first user based on the match satisfaction estimated by using the machine learning model. For example, the server 300 may select a user corresponding to the greatest value among the estimated match satisfactions, as the next counterpart.

Alternatively, the server 300 may receive a satisfaction factor from the first electronic apparatus 100. Herein, the satisfaction factor may include various factors used to calculate the satisfaction. For example, the server 300 may train the machine learning model corresponding to the correlation between a face image of the user of the first electronic apparatus 100, a face image of the counterpart user, and the satisfaction factor associated with the matching result of a first user. For another example, the server 300 may train the machine learning model corresponding to the correlation between feature point distribution information obtained from the face image of a user of the first electronic apparatus 100, feature point distribution information obtained from the face image of a counterpart user, and the satisfaction factor associated with the matching result of the first user.

The server 300 may verify the communication state of the electronic apparatus (i.e., the second electronic apparatus 200) of the selected counterpart user and may establish a session for a video call between the first electronic apparatus 100 and the second electronic apparatus 200, and thus may make it possible to make a video call between users of the first electronic apparatus 100 and the second electronic apparatus 200. That is, the user of the first electronic apparatus 100 may launch the video call application to utilize the random video call service with an arbitrary user. At this time, the match satisfaction of the user of the first electronic apparatus 100 for the user of the second electronic apparatus 200 may be verified through various methods, and the verified match satisfaction may be transmitted to the server 300 so as to be used to train the matching result.

Hereinafter, an electronic apparatus and a communication method thereof according to an embodiment of the present disclosure will be described in more detail with reference to FIGS. 2 to 6; and a server and an operating method thereof according to an embodiment of the present disclosure will be described in more detail with reference to FIGS. 7 to 9.

Figure 2:
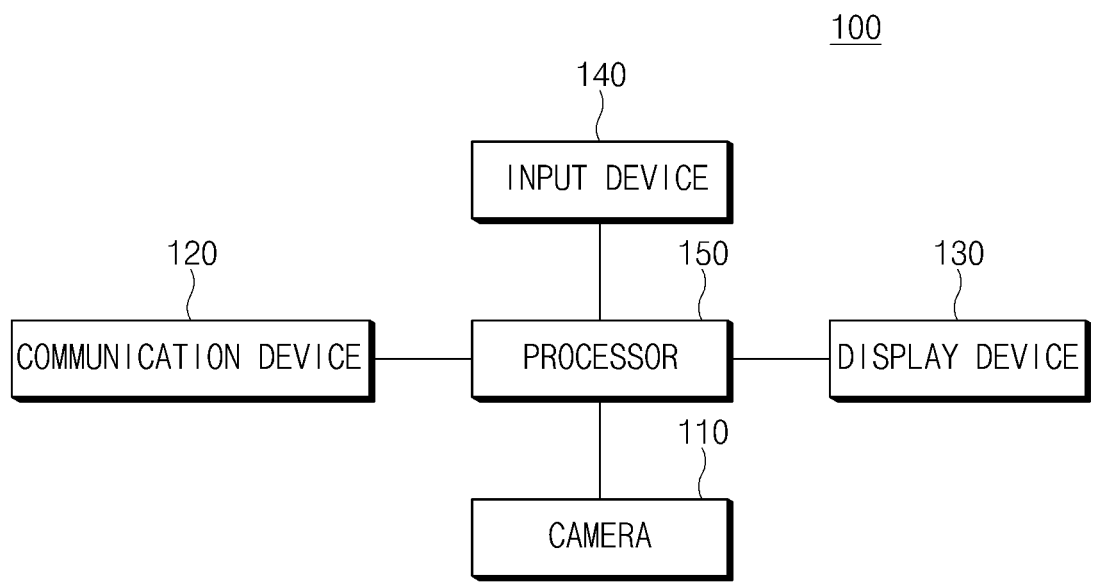
FIG. 2 is a block diagram illustrating an electronic apparatus, according to an embodiment of the present disclosure.

FIG. 2 is a block diagram illustrating an electronic apparatus, according to an embodiment of the present disclosure.

Referring to FIG. 2, the electronic apparatus 100 according to an embodiment of the present disclosure may include a camera 110, a communication device 120, a display device 130, an input device 140, and a processor 150.

The camera 110 may capture a user (hereinafter referred to as a 'first user') to generate a user image. For example, the camera 110 may be disposed on the front surface of the electronic apparatus 100 so as to capture the first user, but is not limited thereto. For example, it is possible for the camera 110 to be disposed on the rear surface. The generated user image may be displayed through the display device 130 and may be transmitted to an electronic apparatus (e.g., the second electronic apparatus 200, refer to FIG. 1) of another user through the communication device 120. Furthermore, the generated user image may be transmitted to the processor 150. For example, the generated user image may include a face image of the first user.

The communication device 120 may communicate with the electronic apparatus (e.g., the second electronic apparatus 200, refer to FIG. 1) of the video call counterpart user (hereinafter referred to as a 'second user') and/or the server 300. For example, the communication device 120 may communicate with the electronic apparatus (i.e., the second electronic apparatus 200) of the second user and/or the server 300 via various wired and/or wireless communication networks. The communication device 120 may transmit the user image captured by the camera 110, to the electronic apparatus (i.e., the second electronic apparatus 200) of the second user matched by the server 300 and may receive a counterpart image from the second electronic apparatus 200.

The communication device 120 may transmit the face image of a user captured by the camera 110, to the server 300. The communication device 120 may transmit feature point distribution information obtained from the face image of a user generated by the processor 150, to the server 300. The communication device 120 may transmit a satisfaction factor corresponding to an input received from the user, to the server 300. The communication device 120 may transmit the match satisfaction calculated by the processor 150, to the server 300. Moreover, the communication device 120 may receive the profile information of the second user from the server 300 (refer to FIG. 1).

For example, the communication device 120 may include a long range network interface such as a 3G module, an LTE module, an LTE-A module, a Wi-Fi module, a WiGig module, an Ultra-Wide Band (UWB) module, an LAN card, or the like. Also, the communication device 120 may include a short range network interface such as a Magnetic Secure Transmission (MST), a Bluetooth module, an NFC module, an RFID module, a ZigBee module, a Z-Wave module, an infrared module, or the like. Moreover, the communication device 120 may include other network interfaces.

The display device 130 may display a user image, the counterpart image (i.e., the user image of the second user) of a video call counterpart, and/or at least one object. For example, the at least one object may be displayed to overlap with the counterpart image of a video call counterpart and may be displayed in the form of an icon or a soft button. The at least one object may include a first object for executing a friend adding function and a second object for executing a favorability displaying function. The favorability displaying function may be a function for the user to display the favorability to the second user; and the favorability displaying function may be implemented to increase a favorability index of the second user, when the user selects the second object.

In the meantime, the display device 130 may be, but is not limited to, a liquid-crystal display (LCD), an active-matrix organic light-emitting diode (AM-OLED) panel, or the like. In addition, the display device 130 may be provided as a touch screen including a touch panel, and may include the function of the input device 140.

The input device 140 may receive an input from the first user. For example, the input device 140 may receive various inputs such as a video call request input, a first input to select at least one object, and a second input to request a video call to another counterpart, or the like, from the first user. Herein, the second input may mean an input to make a request for a video call to another counterpart by the first user after a video call to an arbitrary counterpart is started as the video call request input is received from the first user.

For example, the input device 140 may include a microphone, a keyboard, a mouse, a trackball, a touch screen, a button, a switch, a sensor, a network interface, other input devices, or the like. Meanwhile, as described above, the display device 130 may include the function of the input device 140, when the display device 130 is provided as a touch screen; in this case, the input to request a video call may be defined as a touch and drag operation or a swipe operation.

The processor 150 may control the video call function of the electronic apparatus 100 overall. The processor 150 may include one or more processors. The processor included in the processor 150 may perform an arithmetic operation and/or a logical operation for operating the electronic apparatus 100.

The processor 150 may receive the face image of a user captured through the camera 110. The processor 150 may generate feature point distribution information by using the face image of the user. The feature point distribution information may include coordinate information about at least one or more specific points of the user's face. For example, the feature point distribution information may include information about coordinates of each of the points corresponding to the eyes, nose, mouth, eyebrows, cheekbones and the like of the user's face. The feature point distribution information may include coordinate information corresponding to various points of the user's face. The feature point distribution information obtained from the generated user image may be output to the server 300 through the communication device 120. The feature point distribution information may be described with reference to FIG. 3.

Figure 3:
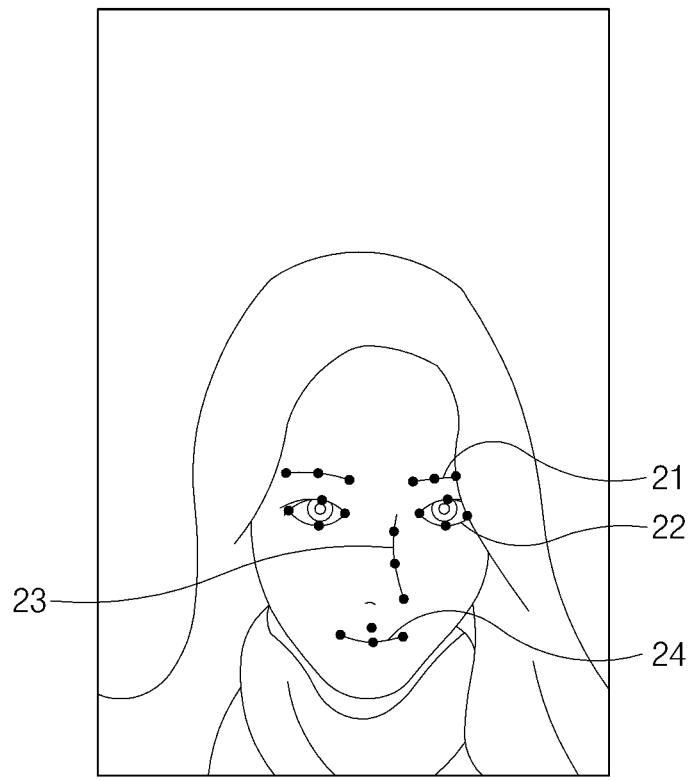
FIG. 3 is a view illustrating feature point distribution information obtained from a face image of a user, according to an embodiment of the present disclosure.

FIG. 3 is a view illustrating feature point distribution information obtained from a face image of a user, according to an embodiment of the present disclosure. For example, the image of a user illustrated in FIG. 3 may be the face image of a first user. The feature point distribution information obtained from the face image of the first user may include information 21 about coordinates of each of at least one or more points included in an eyebrow area, information 22 about coordinates of each of at least one or more points included in an eye area, information 23 about coordinates of each of at least one or more points included in a nose area, and information 24 about coordinates of each of at least one or more points included in a lip area. The feature point distribution information may not be limited to the above-described information and may include information about coordinates of a point included in various face areas.

Returning to FIG. 2, the processor 150 may transmit a request for a video call to the server 300 (refer to FIG. 1) in response to the first user's video call request input, which is input through the input device 140, and may receive profile information of the found counterpart (i.e., a second user) of the video call from the server 300. Herein, the profile information may include at least one of the name, nationality, favorability, profile image, and blocking history of the second user.

For example, the 'favorability' may be defined as the extent to which the second user receives interest from other users while the second user utilizes a video call service by using a video call application together with other users; the degree of 'favorability' may be rated through a function such as 'likes' and 'recommendations' in a social network service. The 'blocking history' may be defined as a history of being blocked or reported from other users in the process in which the second user utilizes the video call application.

The processor 150 may calculate the match satisfaction of the first user associated with the second user. Herein, the 'match satisfaction' may indicate the satisfaction of the first user associated with the second user, who is matched by the server 300.

The processor 150 may calculate the match satisfaction based on whether at least one of a first input or a second input entered by the first user is received. In the meantime, the processor 150 may calculate the match satisfaction based on various factors such as match duration, who is a user who has terminated the match, whether to perform text messaging during the match and the number of times that the messaging is performed, the number of times that a language translation function is used during the match, the type/frequency/time/ratio of facial expression detected from the user's image during the match, whether the first user is silent, the utterance time of both parties (or the first user) during the match/ratio of the utterance time to the total match time/average frequency of a voice/average magnitude of a voice/voice tone, the number of times that laughter is detected in the sound generated during the match, whether the related words such as like or dislike (abuse, or the like) are detected in the sound generated during the match or in a text message or the number of times that the related words are detected in the sound generated during the match or in a text message, how much the user moved during the match, the number of times that the body language occurred during the match, whether a body language associated with like or dislike is detected in the body language generated during the match or the number of times that the body language associated with like or dislike is detected in the body language, whether a video call, messaging, or friend application is made after the match, the number/frequency of interactions after users became friends, whether to exchange the ID or telephone number of another platform, whether the first user is blocked or reported, whether a specific input is received from the first user, or the like in addition to the first input or the second input.

For example, the processor 150 may calculate match satisfaction by using the following Equation 1.

$$S = \sum_{k=1}^{n} p_k f_k \quad \text{[Equation 1]}$$

In Equation 1, 'k' may represent the number of satisfaction factors and '$f_k$' may represent a satisfaction factor. Furthermore, '$p_k$' may represent the coefficient of the satisfaction factor. For example, the first satisfaction factor '$f_1$' may indicate whether a first input is received; the second satisfaction factor '$f_2$' may represent the elapsed time until a second input is received from a point in time when a counterpart image (i.e., the user image of the second user) is displayed in the display device 130, when the second input is received.

That is, referring to Equation 1 above, since the first satisfaction factor '$f_1$' is a value based on an input (i.e., the first input) for the first user to select a first object for executing a friend adding function and/or a second object for executing a favorability displaying function, the value of match satisfaction 'S' may increase, when the first input is received.

Moreover, the second satisfaction factor '$f_2$' is a value based on the elapsed time until the second input is received from a point in time when the counterpart image (i.e., the user image of the second user) is displayed in the display device 130, the value of the match satisfaction 'S' may increase as the elapsed time is longer. That is, since the second input is an input to request a video call to another counterpart, it may seem that the first user is interested in the second user, as the elapsed time is longer.

The processor 150 may transmit the calculated match satisfaction to the server 300 through the communication device 120. Alternatively, the processor 150 may not calculate the match satisfaction but transmit the first satisfaction factor '$f_1$' and the second satisfaction factor '$f_2$' to the server 300 through the communication device 120. Each of the first satisfaction factor '$f_1$' and the second satisfaction factor '$f_2$' may be defined as one value among the above-described various factors, in addition to a value based on the first input and the second input.

Figure 4:
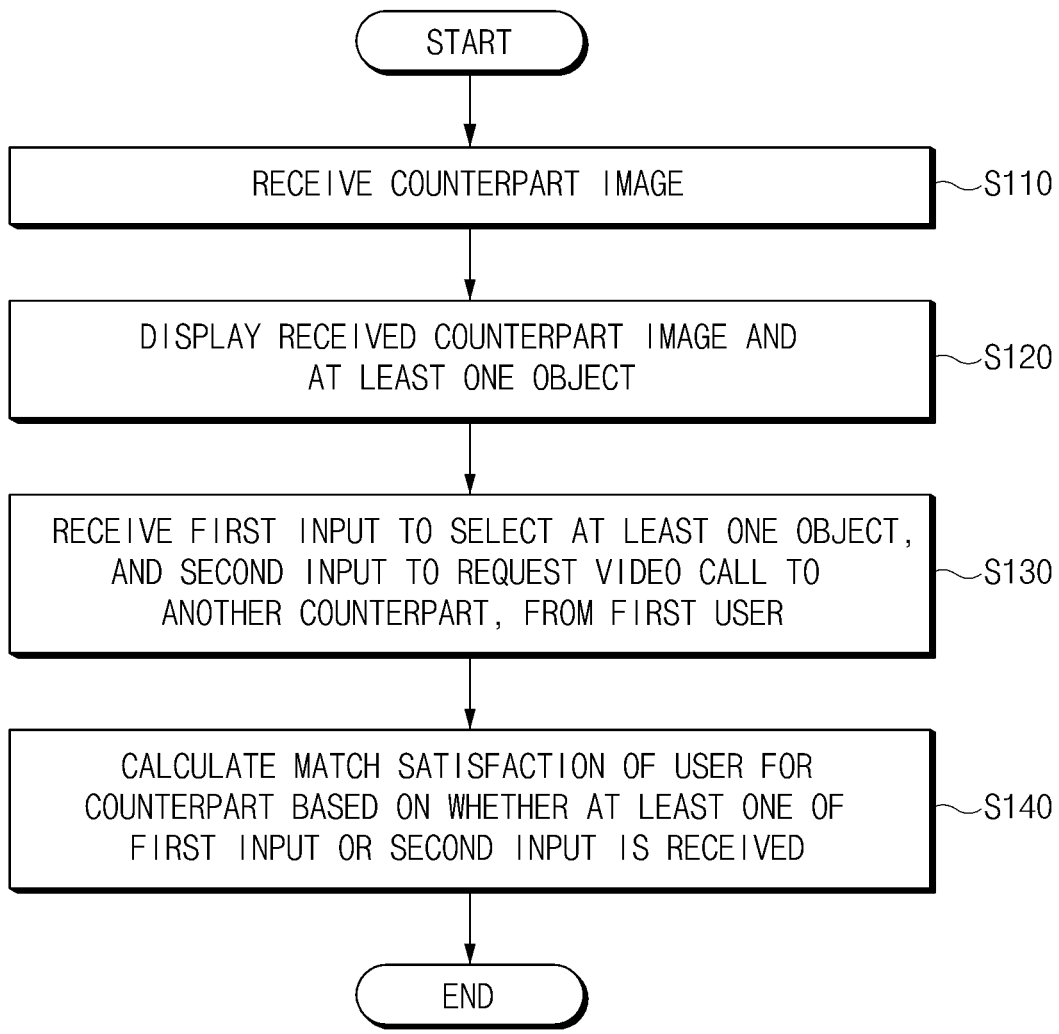
FIG. 4 is a flowchart illustrating a communication method of an electronic apparatus, according to an embodiment of the present disclosure.
Figure 5:
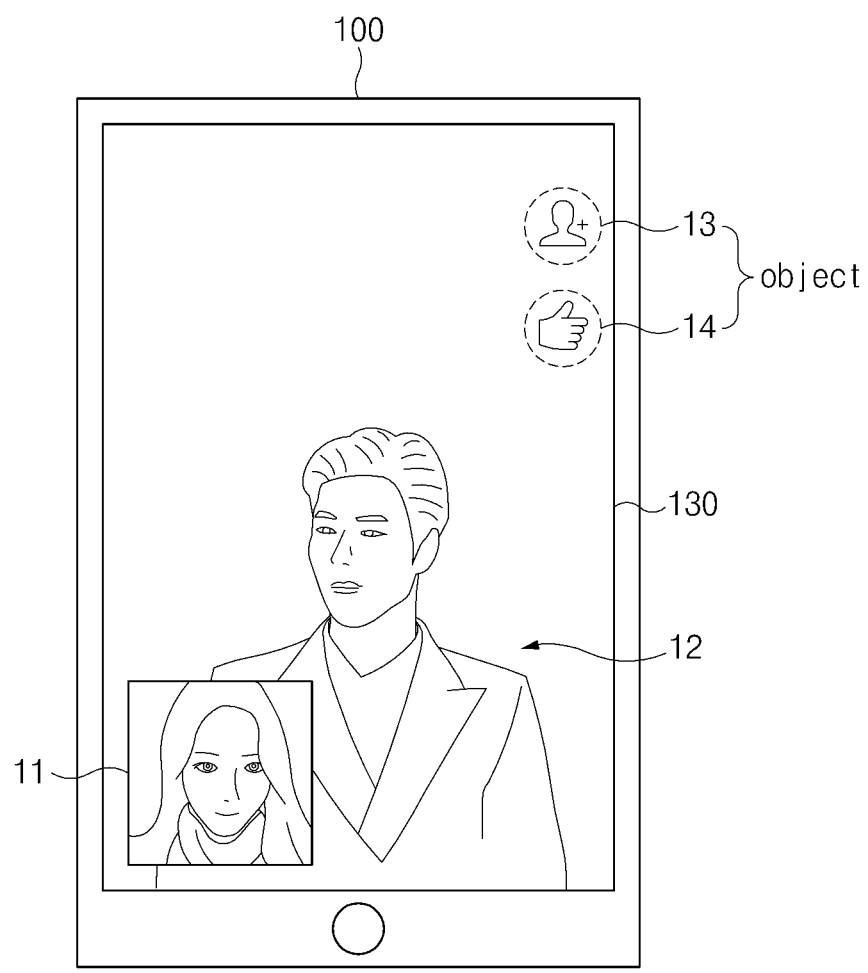
FIGS. 5 and 6 are views for describing a communication method of an electronic apparatus, according to an embodiment of the present disclosure.
Figure 6:
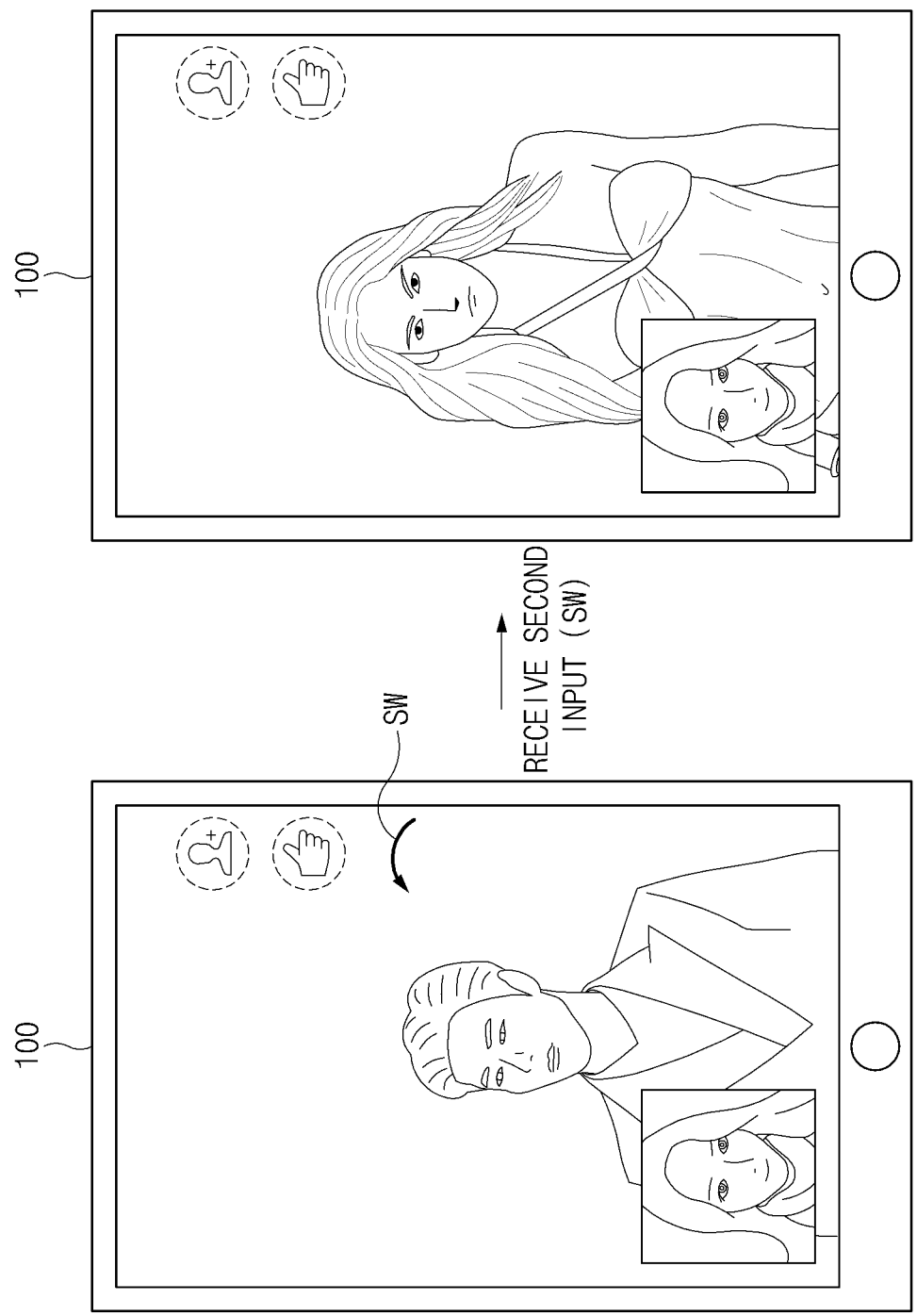

FIG. 4 is a flowchart illustrating a communication method of an electronic apparatus, according to an embodiment of the present disclosure. FIGS. 5 and 6 are views for describing a communication method of an electronic apparatus, according to an embodiment of the present disclosure.

First of all, referring to FIG. 4, a communication method of an electronic apparatus according to an embodiment of the present disclosure may include operation S110 of receiving a counterpart image, operation S120 of displaying the received counterpart image and at least one object, operation S130 of receiving, from a user, at least one of a first input to select at least one object or a second input to request a video call to another counterpart, and operation S140 of calculating match satisfaction of the user for a counterpart based on whether at least one of the first input or the second input is received.

Hereinafter, operation S110 to operation S140 will be described in detail with reference to FIG. 2.

In operation S110, the communication device 120 may receive a counterpart image from an electronic apparatus (i.e., the second electronic apparatus) of a video call counterpart (i.e., the second user) matched by the server 300.

In operation S120, referring to FIG. 5, the display device 130 may display a user image 11 of the first user, the counterpart image 12 (i.e., a user image of the second user), and at least one or more objects 13 and 14.

For example, the at least one or more objects 13 and 14 may be displayed to overlap with the counterpart image and may be displayed in the form of an icon or a soft button. Each of the at least one or more objects 13 and 14 may include the first object 13 for executing a friend adding function and the second object 14 for executing a favorability displaying function. The favorability displaying function is a function for the first user to display the favorability to the counterpart of a video call; the favorability displaying function may be implemented to increase the favorability index of the counterpart of a video call, when the first user selects the second object 14. For example, the display device 130 may be provided as a touch screen including a touch panel, and may include the function of the input device 140.

In operation S130, the input device 140 may receive an input from the first user. For example, the input device 140 may receive various inputs such as a video call request input, a first input to select at least one object, and a second input to request a video call to another counterpart, or the like, from the first user. Herein, the second input may mean an input to make a request for a video call to another counterpart by the first user after a video call to an arbitrary counterpart is started as the video call request input is received from the first user.

In operation S140, the processor 150 may calculate the match satisfaction based on whether at least one of a first input or a second input entered by the first user is received. For example, the processor 150 may calculate match satisfaction by using the following Equation 1.

For example, referring to FIG. 5, since the first satisfaction factor '$f_1$' of Equation 1 is a value based on an input (the first input) for the first user to select the first object 13 for executing the friend adding function and/or the second object 14 for executing the favorability displaying function, the value of match satisfaction 'S' may increase, when the first input is received.

Moreover, referring to FIG. 6, the processor 150 may calculate the match satisfaction based on the elapsed time until a second input SW is received from a point in time when the counterpart image is displayed in the display device 130, when the second input SW is received. For example, the second input SW may be defined as a touch and drag operation or a swipe operation.

For example, since the second satisfaction factor '$f_2$' of Equation 1 is the elapsed time until the second input SW is received from a point in time when the counterpart image (i.e., the user image of the second user) is displayed in the display device 130, the value of the match satisfaction 'S' may increase as the elapsed time is longer. That is, since the second input is an input to request a video call to another counterpart, it may seem that the first user is interested in the second user, as the elapsed time is longer.

Figure 7:
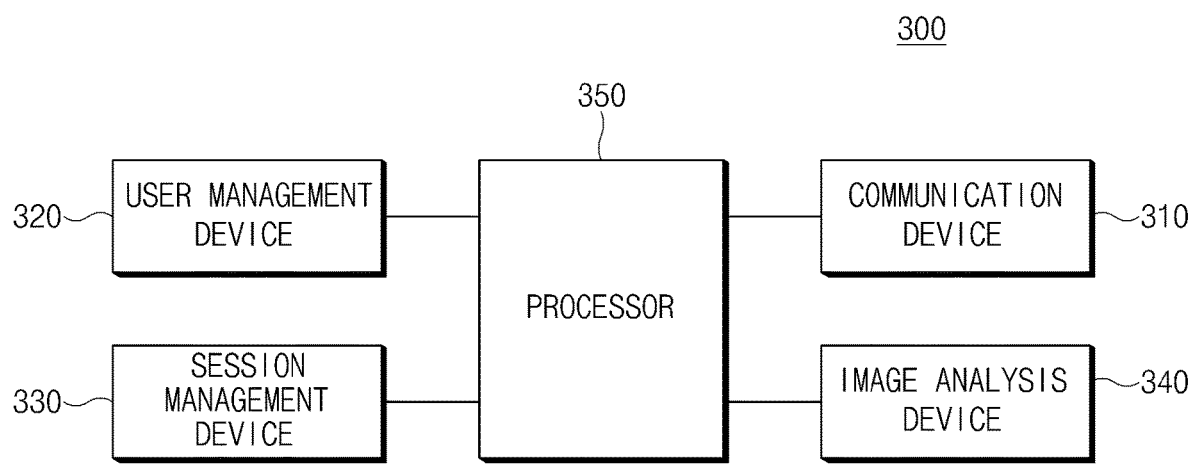
FIG. 7 is a block diagram illustrating a server, according to an embodiment of the present disclosure.

FIG. 7 is a block diagram illustrating a server, according to an embodiment of the present disclosure.

Referring to FIG. 7, the server 300 may include a communication device 310, a user management device 320, a session management device 330, an image analysis device 340, and a processor 350.

The user management device 320, the session management device 330, the image analysis device 340, and the processor 350 may be implemented in the hardware, software, or hybrid form.

In the hardware form, the user management device 320, the session management device 330, the image analysis device 340, and the processor 350 may include one or more digital and/or analog circuits to perform operations to be described later. In the software form, the user management device 320, the session management device 330, the image analysis device 340, and the processor 350 may include one or more instruction codes for performing operations to be described later. The instruction codes may be complied or translated to an instruction set by one or more processors included in the server 300 and then may be processed.

The communication device 310 may receive a video call connection request, a face image of a user, feature point distribution information obtained from an image of the user, match satisfaction, and/or a satisfaction factor for calculating the match satisfaction from the electronic apparatus 100 (refer to FIG. 1). The communication device 310 may communicate with electronic apparatuses (e.g., the first electronic apparatus 100 and the second electronic apparatus 200, refer to FIG. 1) through various wired and/or wireless communication networks.

For example, the communication device 310 may include a long range network interface such as a 3G module, an LTE module, an LTE-A module, a Wi-Fi module, a WiGig module, an Ultra-Wide Band (UWB) module, an LAN card, or the like. Also, the communication device 310 may include a short range network interface such as a Magnetic Secure Transmission (MST), a Bluetooth module, an NFC module, an RFID module, a ZigBee module, a Z-Wave module, an infrared module, or the like. Moreover, the communication device 310 may include other network interfaces.

The user management device 320 may search for and/or select the second user, who becomes a video call counterpart, from among a plurality of standby users, in response to a video call connection request. Herein, the plurality of standby users may mean users of other electronic apparatuses capable of connecting to a video call to the first user. For example, the user management device 320 may store profile information of each of the users of the electronic apparatuses 100 and 200 and profile information of each of a plurality of standby users, and the profile information may include the face images of the users. For another example, the user management device 320 may store feature point distribution information received from each of the electronic apparatuses 100 and 200.

The user management device 320 may select the second user and/or the third user by using the match satisfaction of the first user, which is calculated by the processor 350, for each of the plurality of standby users. That is, the user management device 320 may select a user corresponding to the greatest value of the estimated or calculated match satisfactions, as the next counterpart (e.g., the second user and/or the third user) of the first user.

As a result, the match satisfaction of the first user may increase by presenting a user who is likely to be interested in the first user as a video call counterpart based on the trained result.

In the meantime, the user management device 320 may search for the second user by using the similarity between face images of users. In this case, the user management device 320 may search for a user with the highest similarity as the second user by using the similarity between the image of the first user transmitted from the image analysis device 340 and each of the stored images of users. The found second user may be presented as the video call counterpart of the first user. As a result, compared with the case that the first user matches a user who has a face that does not resemble the first user's face, the first user may have high match satisfaction, when the first user matches a user having a face resembling the first user's face.

The user management device 320 may search for the second user by using feature point distribution information of the face of each of users. The user management device 320 may calculate the similarity between feature point distribution information of the first user and feature point distribution information of each of the remaining users. The user management device 320 may select a user, who has the feature point distribution with the highest similarity with the feature point distribution information of the first user, as the second user. For another example, the user management device 320 may search for the second user by using the face image of each of users. The user management device 320 may calculate the similarity between the face image of the first user and the face image of each of the remaining users.

The session management device 330 may establish a session for a video call between electronic apparatuses (e.g., the first electronic apparatus 100 and the second electronic apparatus 200, refer to FIG. 1).

The image analysis device 340 may analyze the face image of each of users to obtain feature point distribution information. In particular, the image analysis device 340 may extract coordinates associated with at least one or more specific points of the face of each of users to generate the feature point distribution information. The image analysis device 340 may obtain first feature point distribution information from the face image of the first user and may obtain second feature point distribution information from the face image of the second user. The image analysis device 340 may analyze face image information of each of users stored in the user management device 320 to obtain the feature point distribution information. Herein, the feature point distribution information may mean information defining the distribution form of feature points corresponding to predetermined parts (e.g., eyes, nose, mouth, eyebrows, cheekbones, and the like) of the user's face. Moreover, the image analysis device 340 may analyze the similarity between the image of the first user and the stored image of each of users.

The processor 350 may train a machine learning model. For example, the processor 350 may train the machine learning model corresponding to the correlation between the face image of the first user, the face image of the second user, and the match satisfaction. For another example, the processor 350 may train the machine learning model corresponding to the correlation between first feature point distribution information, second feature point distribution information, and the match satisfaction. For another example, the processor 350 may train the machine learning model corresponding to the correlation between the face image of the first user, the face image of the second user, and a satisfaction factor. For another example, the processor 350 may train the machine learning model corresponding to the correlation between first feature point distribution information, second feature point distribution information, and the satisfaction factor.

The processor 350 may train the machine learning model by using a deep learning algorithm. The machine learning model may include at least one or more of Deep Neural Network (DNN), Convolutional Neural Network (CNN), Recurrent Neural Network (RNN), Region-based Convolutional Neural Networks (R-CNN), Restricted Boltzmann Machine (RBM), Deep Belief Network (DBN), or Deep Q-Networks. Moreover, the machine learning model may include Convolutional Neural Network (CNN), AlexNet, ZFNet, GoogLeNet, VGGNet, ResNet, Inception-ResNet, Inception-v2, Inception-v3, or Inception-v4.

The processor 350 may train the machine learning model by using the match satisfaction or the satisfaction factor. The processor 350 may include the machine learning model. For example, the machine learning model may correspond to the correlation between the face image of the first user, the face image of the second user, and the match satisfaction. For another example, the machine learning model may correspond to the correlation between the first feature point distribution information, the second feature point distribution information, and the match satisfaction. For another example, the machine learning model may correspond to the correlation between the face image of the first user, the face image of the second user, and the satisfaction factor. For another example, the machine learning model may correspond to the correlation between the first feature point distribution information, the second feature point distribution information, and the satisfaction factor.

The machine learning model may be a neural network including at least two or more layers. The machine learning model may include an input layer and an output layer. The machine learning model may further include at least one or more hidden layers.

That is, the processor 350 may train the machine learning model corresponding to the correlation between the face image of the first user, the face image of the second user, and the match satisfaction or may train the machine learning model corresponding to the correlation between the first feature point distribution information, the second feature point distribution information, and the match satisfaction. The processor 350 may train the machine learning model corresponding to the correlation between the face image of the first user, the face image of the second user, and the satisfaction factor or may train the machine learning model corresponding to the correlation between the first feature point distribution information, the second feature point distribution information, and the satisfaction factor.

The processor 350 may estimate the match satisfaction of the first user corresponding to each of a plurality of users by using the machine learning model. The processor 350 may select the next counterpart to be matched with the first user, based on the estimated match satisfaction. For example, the processor 350 may select a user corresponding to the greatest value among the estimated match satisfactions, as the next counterpart.

The amount of computation for training may be reduced rather than training the machine learning model by using the face image of the first user and the face image of the second user, when the processor 350 trains the machine learning model by using the first feature point distribution information, and the second feature point distribution information. Accordingly, the processor 350 may rapidly train the machine learning model, when the processor 350 trains the machine learning model by using the first feature point distribution information and the second feature point distribution information.

Alternatively, the processor 350 may train the machine learning model by using the first satisfaction factor '$f_1$' and the second satisfaction factor '$f_2$' received from the electronic apparatus 100. For example, the processor 350 may train the first machine learning model corresponding to the correlation between the face image of the first user, the face image of the second user, and the first satisfaction factor '$f_1$'. Furthermore, the processor 350 may train the second machine learning model corresponding to the correlation between the face image of the first user, the face image of the second user, and the second satisfaction factor '$f_2$'.

For another example, the processor 350 may train the first machine learning model corresponding to the correlation between the first feature point distribution information, the second feature point distribution information, and the first satisfaction factor '$f_1$'. Furthermore, the processor 350 may train the second machine learning model corresponding to the correlation between the first feature point distribution information, the second feature point distribution information, and the second satisfaction factor '$f_2$'.

The processor 350 may estimate the first satisfaction factor '$f_1$' of the first user for each of a plurality of standby users by using the first machine learning model and may estimate the second satisfaction factor '$f_2$' of the first user for each of the plurality of standby users by using the second machine learning model. The processor 350 may calculate the match satisfaction of the first user for each of the plurality of standby users by using the first satisfaction factor '$f_1$' and the second satisfaction factor '$f_2$' of each of the plurality of standby users. For example, the processor 350 may calculate the match satisfaction of the first user for each of the plurality of users in the manner the same as above-described Equation 1.

Figure 8:
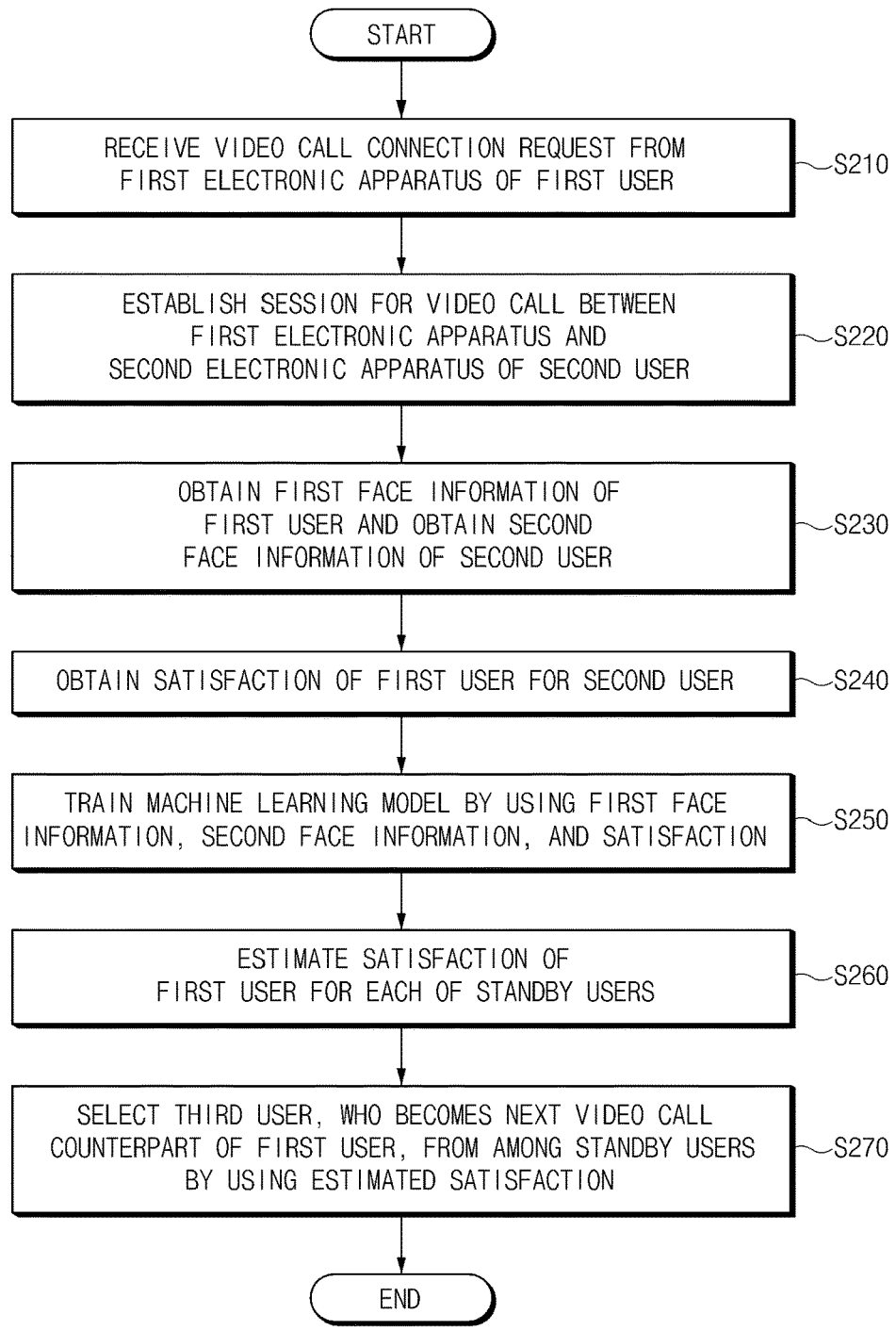
FIG. 8 is a flowchart illustrating an operating method of a server, according to an embodiment of the present disclosure.

FIG. 8 is a flowchart illustrating an operating method of a server, according to an embodiment of the present disclosure.

Referring to FIG. 8, an operating method of a server according to an embodiment of the present disclosure may include operation S210 of receiving a video call connection request from a first electronic apparatus of a first user, operation S220 of establishing a video call session between the first electronic apparatus and a second electronic apparatus of a second user, operation S230 of obtaining first face information of the first user and obtaining second face information of the second user, operation S240 of obtaining satisfaction of the first user for the second user, operation S250 of training a machine learning model by using first face information, second face information, and satisfaction, operation S260 of estimating the satisfaction of the first user for each of standby users, and operation S270 of selecting a third user, who becomes the next video call counterpart of the first user among standby users by using the estimated satisfaction.

Hereinafter, operation S210 to operation S270 will be described with reference to FIG. 7 in more detail.

In operation S210, the communication device 310 may receive a video call connection request from the electronic apparatus 100 (refer to FIG. 1).

In operation S220, the session management device 330 may establish a session for a video call between electronic apparatuses (e.g., the first electronic apparatus 100 and the second electronic apparatus 200, refer to FIG. 1).

In operation S230, the server 300 may obtain first face information of the first user and may obtain second face information of the second user. For example, the first face information may be the face image of the first user stored in the user management device 320. The second face information may be the face image of the second user stored in the user management device 320.

For another example, the first face information may be first feature point distribution information obtained from the face image of the first user stored in the user management device 320. The second face information may be second feature point distribution information obtained from the face image of the second user stored in the user management device 320. The first feature point distribution information and the second feature point distribution information may be received from the first electronic apparatus 100 and the second electronic apparatus 200, respectively. The first feature point distribution information and the second feature point distribution information may be obtained from the image analysis device 340.

In operation S240, the communication device 310 of the server 300 may obtain the satisfaction of the first user for the second user from the first electronic apparatus 100. For example, the satisfaction may be match satisfaction calculated from the first electronic apparatus 100. For another example, the satisfaction may be at least one or more satisfaction factors received from the first electronic apparatus 100. For another example, the satisfaction may be match satisfaction calculated by the processor 350 by using at least one or more satisfaction factors received from the first electronic apparatus 100.

In operation S250, the processor 350 of the server 300 may train the machine learning model by using the first face information, the second face information, and the satisfaction. For example, the processor 350 may train the machine learning model by using the face image of the first user, the face image of the second user, and the match satisfaction. For another example, the processor 350 may train the machine learning model by using the face image of the first user, the face image of the second user, and at least one or more satisfaction factors.

For another example, the processor 350 may train the machine learning model by using first feature point distribution information, second feature point distribution information, and match satisfaction. For another example, the processor 350 may train the machine learning model by using the first feature point distribution information, the second feature point distribution information, and at least one or more satisfaction factors.

In operation S260, the processor 350 may estimate match satisfaction of the first user for each of standby users, by using the trained machine learning model. For example, the processor 350 may estimate the match satisfaction of the first user for each of standby users, by using the face image of the first user, the face image of each of standby users, and the trained machine learning model.

For another example, the processor 350 may estimate at least one or more satisfaction factors of the first user for each of standby users, by using the face image of the first user, the face image of each of standby users, and the trained machine learning model. For another example, the processor 350 may estimate the match satisfaction of the first user for each of standby users, by using the first feature point distribution information, the feature point distribution information of each of standby users, and the trained machine learning model.

For another example, the processor 350 may estimate at least one or more satisfaction factors of the first user for each of standby users, by using the first feature point distribution information, the feature point distribution information of each of standby users, and the trained machine learning model. The processor 350 may transmit the estimated match satisfaction of the first user to the user management device 320.

In operation S270, the user management device 320 may select a third user, who becomes the next video call counterpart of the first user, by using the estimated match satisfaction. For example, the user management device 320 may select a user corresponding to the greatest match satisfaction value among estimated match satisfactions of the standby users, as the third user.

For another example, the processor 350 may calculate the match satisfaction of the first user for each of standby users, by using the estimated at least one or more satisfaction factors. The processor 350 may transmit the calculated match satisfaction to the user management device 320. The user management device 320 may select a third user, who becomes the next video call counterpart of the first user, by using the calculated match satisfaction. For example, the user management device 320 may select a user corresponding to the greatest match satisfaction value among calculated match satisfactions of each of the standby users, as the third user.

Figure 9:
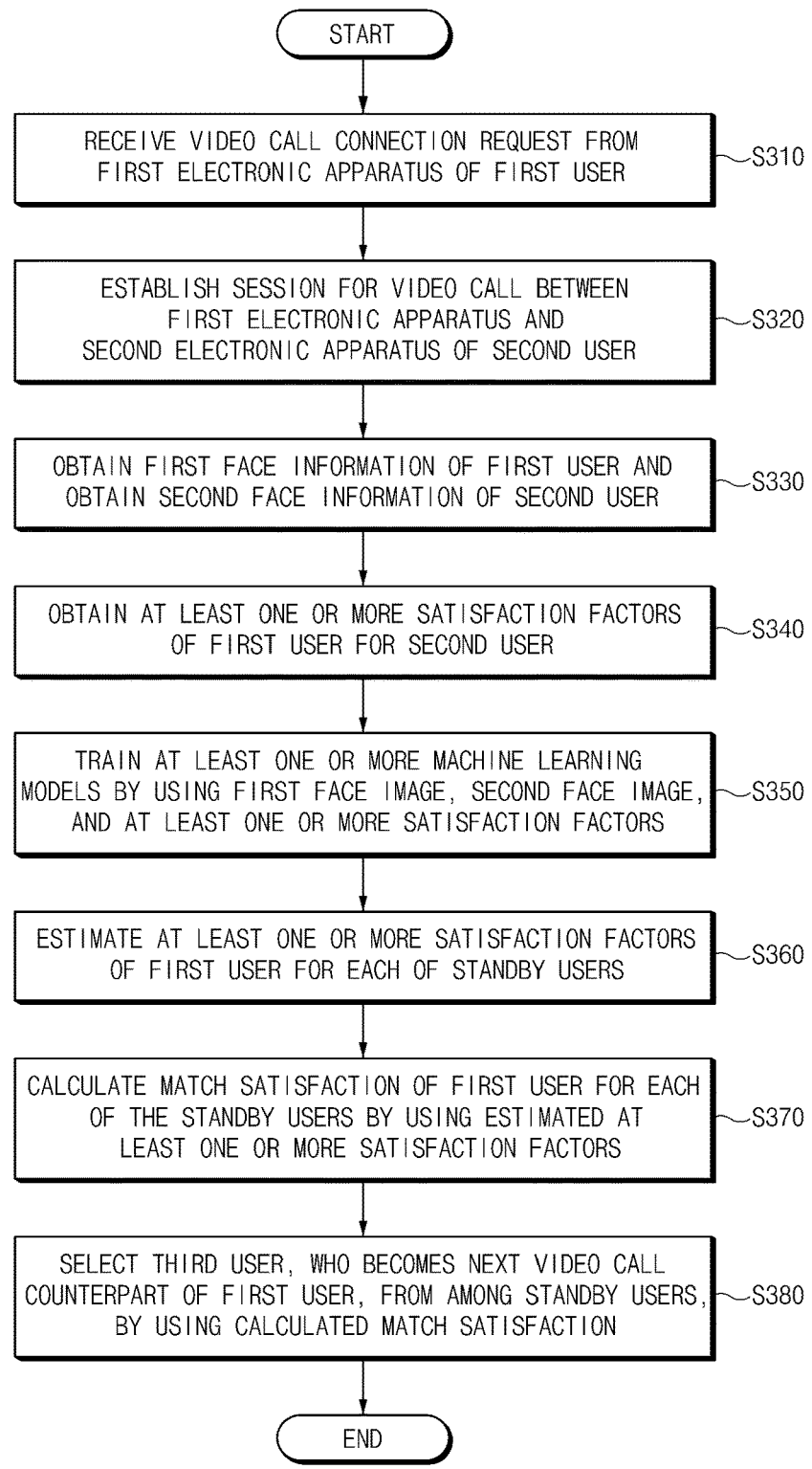
FIG. 9 is a flowchart illustrating an operating method of a server, according to another embodiment of the present disclosure.

FIG. 9 is a flowchart illustrating an operating method of a server, according to another embodiment of the present disclosure.

Referring to FIG. 9, an operating method of a server according to an embodiment of the present disclosure may include operation S310 of receiving a video call connection request from a first electronic apparatus of a first user, operation S320 of establishing a video call session between the first electronic apparatus and a second electronic apparatus of a second user, operation S330 of obtaining first face information of the first user and obtaining second face information of the second user, operation S340 of receiving at least one or more satisfaction factors of the first user for the second user from the first electronic apparatus through the video call session, operation S350 of training at least one or more machine learning models by using first face information, second face information, and at least one or more satisfaction factors, operation S360 of estimating at least one or more satisfaction factors of the first user for each of standby users by using the trained at least one or more machine learning models, when a video call connection between the first electronic apparatus and the second electronic apparatus is terminated, operation S370 of calculating match satisfaction of the first user for each of standby users by using the estimated at least one or more satisfaction factors, and operation S380 of selecting a third user, who becomes the next video call counterpart of the first user among standby users, by using the calculated match satisfaction.

Hereinafter, operation S310 to operation S380 will be described with reference to FIG. 7 in more detail. However, operation S310 to operation S330 are substantially the same as operation S210 to operation S230 given with reference to FIG. 8, and thus the detailed description will be omitted for the purpose of avoiding the repetition of description. That is, an operating method of a server illustrated in FIG. 9 according to an embodiment of the present disclosure may have a difference from an operating method of a server illustrated in FIG. 8 according to an embodiment of the present disclosure in that it is possible to estimate each of the first satisfaction factor and the second satisfaction factor of the first user for each of standby users by using the first satisfaction factor and the second satisfaction factor of the first user for the second user, which are received from the electronic apparatus 100 and to calculate match satisfaction of the first user for each of the standby users by using the estimated first satisfaction factor and the estimated second satisfaction factor.

In operation S340, the communication device 310 may obtain the first satisfaction factor '$f_1$' and the second satisfaction factor '$f_2$' of the first user for the second user from the electronic apparatus 100.

In operation S350, the processor 350 may train the machine learning model by using the first satisfaction factor '$f_1$' and the second satisfaction factor '$f_2$'. For example, the processor 350 may train the first machine learning model corresponding to the correlation between the first face image, the second face image, and the first satisfaction factor '$f_1$'. The processor 350 may train the second machine learning model corresponding to the correlation between the first face image, the second face image, and the second satisfaction factor '$f_2$'.

For another example, the processor 350 may train the first machine learning model corresponding to the correlation between the first feature point distribution information, the second feature point distribution information, and the first satisfaction factor '$f_1$'. Furthermore, the processor 350 may train the second machine learning model corresponding to the correlation between the first feature point distribution information, the second feature point distribution information, and the second satisfaction factor '$f_2$'.

In operation S360, the processor 350 may estimate the first satisfaction factor '$f_1$' and the second satisfaction factor '$f_2$' of the first user for each of standby users, by using the trained first machine learning model and the trained second machine learning model. For example, the processor 350 may estimate the first satisfaction factor '$f_1$' of the first user for each standby user by using the first machine learning model and may estimate the second satisfaction factor '$f_2$' of the first user for each standby user by using the second machine learning model.

In operation S370, the processor 350 may calculate the match satisfaction of the first user for each of the standby users by using the first satisfaction factor '$f_1$' and the second satisfaction factor '$f_2$', which are estimated for each standby user. For example, the processor 350 may calculate the match satisfaction of the first user for each standby user by using a method the same as above-described Equation 1.

In operation S380, the user management device 320 may select a third user, who becomes the next video call counterpart of the first user, from among standby users by using the calculated match satisfaction of the first user. For example, the user management device 320 may select a user corresponding to the greatest match satisfaction value among calculated match satisfactions of each of the standby users, as the third user.

Figure 10:
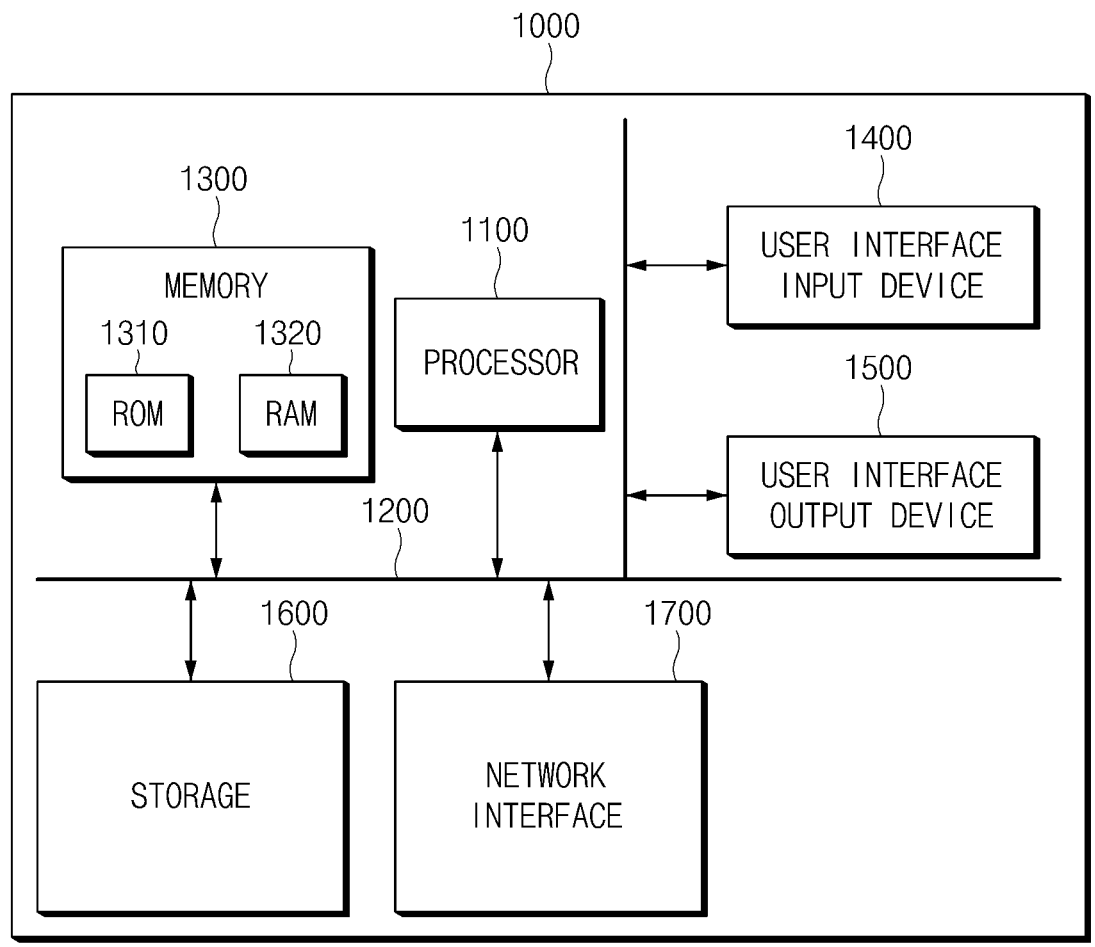
FIG. 10 is a block diagram illustrating a computing system performing a communication method of an electronic apparatus or an operating method of a server, according to an embodiment of the present disclosure.

FIG. 10 illustrates a computing system for performing a communication method of an electronic apparatus or an operating method of a server, according to an embodiment of the present disclosure.

Referring to FIG. 10, according to an embodiment of the present disclosure, the communication method of an electronic apparatus or the operating method of a server may be implemented through the computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may reside in a user terminal. Alternatively, the processor and storage medium may reside as a separate component in the user terminal.

According to the embodiment described above, a sound video call between users may be induced. Moreover, a user during a video call may be prevented from being exposed to an inappropriate image from a counterpart. Moreover, the sexual shame or discomfort that the user during a video call can feel due to an image from the counterpart may be prevented.

The embodiments described above may also be embodied in the form of a recording medium including instructions executable by a computer, such as a program module executed by a computer. The computer-readable medium may be any available medium capable of being accessed by a computer. Furthermore, the computer-readable medium may include all of a volatile medium, a nonvolatile medium, a removable medium, and a non-removable medium.

In addition, the computer-readable medium may also include a computer storage medium or a communication medium. The computer-readable medium may include all of a volatile medium, a nonvolatile medium, a removable medium, and a non-removable medium, which are implemented by using a method or technology for storing information such as a computer-readable instruction, a data structure, a program module, or other data. The communication medium typically may include a computer-readable instruction, a data structure, a program module, other data of the modulated data signal such as a carrier wave, or other transmission mechanisms, and may include any information delivery medium.

Although embodiments of the present disclosure have been described herein with reference to accompanying drawings, it should be understood by those skilled in the art that the present disclosure may be embodied in other specific forms without departing from the spirit or essential characteristics thereof. Therefore, it should be understood that the above embodiments are not limiting, but illustrative.

According to an embodiment of the present disclosure, a server and an operating method thereof may improve the match satisfaction with a counterpart during a video call of a user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An operating method of a server, the method comprising:
   receiving a request for a video call connection from a first electronic apparatus of a first user;
   establishing a video call session between the first electronic apparatus and a second electronic apparatus of a second user;
   obtaining a match satisfaction of the first user for the second user based at least in part on a response of the first user to the second user during the video call session;
   obtaining first face information of the first user including first feature point distribution information and obtaining second face information of the second user including second feature point distribution information;
   training a machine learning model by using the first face information, the second face information, and the match satisfaction to provide a trained machine learning model predictive of match satisfaction of the first user for another user based on face information of the another user;
   estimating match satisfaction of the first user for each of standby users by using the first face information, face information of each of the standby users, and the trained machine learning model, when the video call connection between the first electronic apparatus and the second electronic apparatus is terminated; and
   selecting a third user, who becomes a next video call counterpart of the first user, from among the standby users by using the estimated match satisfactions of the standby users, including the third user, predicted by the machine learning model trained in accordance with the second face information of the second user.

2. The method of claim 1, wherein the satisfaction corresponds to match satisfaction calculated from the first electronic apparatus through the video call session.

3. The method of claim 1, wherein the obtaining of the satisfaction of the first user for the second user includes:
   obtaining at least one or more satisfaction factors of the first user for the second user through the video call session,
   wherein the training of the machine learning model by using the first face information, the second face information, and the satisfaction includes:
   training the machine learning model by using the first face information, the second face information, and the at least one or more satisfaction factors,
   wherein the estimating of the satisfaction of the first user for each of the standby users by using the first face information, the face information of each of the standby users, and the trained machine learning model includes:
   estimating at least one or more satisfaction factors of the first user for each of the standby users by using the first face information, the face information of each of the standby users, and the trained machine learning model, and
   wherein the selecting of the third user, who becomes the next video call counterpart of the first user, from among the standby users by using the estimated satisfaction includes:
   calculating match satisfaction of the first user for each of the standby users by using the estimated at least one or more satisfaction factors; and
   selecting the third user, who becomes the next video call counterpart of the first user, from among the standby users, by using the calculated match satisfaction.

4. The method of claim 1, wherein the satisfaction corresponds to match satisfaction calculated by using at least one or more satisfaction factors of the first user for the second user obtained through the video call session.

5. The method of claim 1, wherein the first face information and the second face information correspond to a face image of the first user and a face image of the second user, respectively.

6. The method of claim 1, wherein the first face information and the second face information correspond to coordinate information about a specific point of a face of the first user and coordinate information about a specific point of a face of the second user, respectively.

7. A server comprising:
   a session management device configured to establish a video call session between a first electronic apparatus of a first user and a second electronic apparatus of a second user;
   a communication device configured to receive match satisfaction calculated from the first electronic apparatus through the video call session based at least in part on a response of the first user to the second user during the video call session;
   an image analysis device configured to obtain first feature point distribution information from a face image of the first user and configured to obtain second feature point distribution information from a face image of the second user;

a processor configured to train a machine learning model by using the first feature point distribution information, the second feature point distribution information, and the match satisfaction to provide a trained machine learning model configured to estimate the match satisfaction of the first user for each of standby users by using the trained machine learning model when a video call connection between the first electronic apparatus and the second electronic apparatus is terminated; and a user management device configured to select a third user, who becomes a next video call counterpart of the first user, from among the standby users by using the estimated match satisfactions of the standby users, including the third user, predicted by the machine learning model trained in accordance with the second face information of the second user.

8. The server of claim 7, wherein the user management device selects a user corresponding to the greatest match satisfaction value of the estimated match satisfaction of each of the standby users, as the third user.

9. The server of claim 7, wherein the face image of the first user and the face image of the second user are stored in the user management device.

10. The server of claim 7, wherein each of the first feature point distribution information and the second feature point distribution information includes distribution information of feature points corresponding to eyes, a nose, a mouth, eyebrows, and cheekbones.

11. The server of claim 7, wherein the user management device selects the second user by using similarity with the face image of the first user.

12. An operating method of a server, the method comprising:
receiving a request for a video call connection from a first electronic apparatus of a first user;
establishing a video call session between the first electronic apparatus and a second electronic apparatus of a second user;
obtaining first face information of the first user including first feature point distribution information and obtaining second face information of the second user including second feature point distribution information;
receiving at least one or more satisfaction factors of the first user for the second user based at least in part on a response of the first user to the second user during the video call session;
training at least one or more machine learning models by using the first face information, the second face information, and the at least one or more satisfaction factors to provide a trained machine learning model predictive of match satisfaction of the first user for another user based on face information of the another user;
estimating the at least one or more satisfaction factors of the first user for each of standby users by using the first face information, face information of each of the standby users, and the trained machine learning model, when the video call connection between the first electronic apparatus and the second electronic apparatus is terminated;
calculating match satisfaction of the first user for each of the standby users by using the estimated at least one or more satisfaction factors; and
selecting a third user, who becomes a next video call counterpart of the first user, from among the standby users by using the calculated match satisfactions of the standby users, including the third user, predicted by the machine learning model trained in accordance with the second face information of the second user.

13. The method of claim 12, wherein the first face information and the second face information correspond to a face image of the first user and a face image of the second user, respectively.

14. The method of claim 12, wherein the first face information and the second face information correspond to coordinate information about a specific point of a face of the first user and coordinate information about a specific point of a face of the second user, respectively.

15. The method of claim 12, wherein the receiving of the at least one or more satisfaction factors of the first user for the second user includes:
receiving a first satisfaction factor and a second satisfaction factor of the first user for the second user,
wherein the training of the at least one or more machine learning models by using the first face information, the second face information, and the at least one or more satisfaction factors includes:
training a first machine learning model by using the first face information, the second face information, and the first satisfaction factor; and
training a second machine learning model by using the first face information, the second face information, and the second satisfaction factor,
wherein the estimating of the at least one or more satisfaction factors of the first user for each of the standby users by using the first face information, the face information of each of the standby users, and the trained machine learning model includes:
estimating each of the first satisfaction factor and the second satisfaction factor of the first user for each of the standby users by using the trained first machine learning model and the trained second machine learning model, and
wherein the calculating of the match satisfaction of the first user for each of the standby users by using the estimated at least one or more satisfaction factors includes:
calculating the match satisfaction of the first user for each of the standby users by using the estimated first satisfaction factor and the estimated second satisfaction factor.

16. The method of claim 15, wherein the first satisfaction factor corresponds to whether a first input to select at least one or more objects displayed in the first electronic apparatus is received by the first user, and
wherein the second satisfaction factor corresponds to an elapsed time until a second input is received from a point in time when the video call session is established, when the second input to terminate the video call session is received by the first user in the first electronic apparatus.

17. The method of claim 15, wherein the estimating of each of the first satisfaction factor and the second satisfaction factor of the first user for each of the standby users by using the trained first machine learning model and the trained second machine learning model includes:
estimating the first satisfaction factor of the first user for each of the standby users by using the first feature point distribution information, feature point distribution of each of the standby users, and the trained first machine learning model; and
estimating the second satisfaction factor of the first user for each of the standby users by using the first feature point distribution information, the feature point distribution of each of the standby users, and the trained second machine learning model.

18. The method of claim 12, wherein the selecting of the third user, who becomes the next video call counterpart of the first user, from among the standby users by using the calculated match satisfaction includes:
selecting a user corresponding to the greatest match satisfaction value of the estimated match satisfaction of each of the standby users, as the third user.

19. The method of claim 1, further comprising:
obtaining a second match satisfaction of the first user for the third user based at least in part on a response of the first user to the third user during a next video call session;
obtaining first face information of the first user including first feature point distribution information and obtaining third face information of the third user including third feature point distribution information; and
retraining the machine learning model by using at least the third face information and the second match satisfaction to provide a retrained machine learning model.

20. The method of claim 1, wherein the machine learning model comprises a neural network including a plurality of layers.

* * * * *